United States Patent
Pinto et al.

(10) Patent No.: US 10,108,450 B2
(45) Date of Patent: Oct. 23, 2018

(54) MECHANISM FOR SSDS TO EFFICIENTLY MANAGE BACKGROUND ACTIVITY WITH NOTIFY

(71) Applicant: SAMSUNG ELECTRONICS CO., LTD., Suwon-si, Gyeonggi-do (KR)

(72) Inventors: Oscar Pinto, San Jose, CA (US); Vishwanath Maram, San Jose, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 246 days.

(21) Appl. No.: 15/186,250

(22) Filed: Jun. 17, 2016

(65) Prior Publication Data

US 2017/0308398 A1    Oct. 26, 2017

Related U.S. Application Data

(60) Provisional application No. 62/325,909, filed on Apr. 21, 2016.

(51) Int. Cl.
| | |
|---|---|
| *G06F 9/46* | (2006.01) |
| *G06F 9/48* | (2006.01) |
| *G06F 3/06* | (2006.01) |

(52) U.S. Cl.
CPC .......... *G06F 9/4837* (2013.01); *G06F 3/0608* (2013.01); *G06F 3/0652* (2013.01); *G06F 3/0679* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,834,386 B1 * | 12/2004 | Douceur | G06F 9/4881 718/102 |
| 8,650,362 B2 | 2/2014 | de la Iglesia et al. | |
| 9,122,588 B1 | 9/2015 | Mondal et al. | |
| 2011/0041039 A1 | 2/2011 | Harari et al. | |
| 2014/0129765 A1 | 5/2014 | Cho | |
| 2014/0215129 A1 | 7/2014 | Kuzmin et al. | |
| 2015/0347025 A1 | 12/2015 | Law | |
| 2016/0092272 A1 * | 3/2016 | Karaje | G06F 9/5011 718/104 |
| 2017/0109101 A1 * | 4/2017 | Hanson | G06F 3/0616 |

* cited by examiner

*Primary Examiner* — Kenneth Tang
(74) *Attorney, Agent, or Firm* — Innovation Counsel LLP

(57) ABSTRACT

A method for notifying a host to manage background activities in a data storage device is disclosed. The method includes: receiving a query from a host operation system (OS); sending to the host OS, in response to the query, a list of background tasks to be performed in a data storage device; receiving a threshold value for one or more of the background tasks from the host OS; setting a timeout value associated with the threshold value; determining and notifying the timeout value to the host OS; determining that the threshold value is reached for a background task; and notifying the host OS that the SSD may perform the background task in the data storage device after the timeout value expires.

21 Claims, 4 Drawing Sheets

MECHANISM FOR SSDS TO EFFICIENTLY MANAGE BACKGROUND ACTIVITY WITH NOTIFY

CROSS-REFERENCE TO RELATED APPLICATION(S)

This application claims the benefits of and priority to U.S. Provisional Patent Application Ser. No. 62/325,909 filed Apr. 21, 2016, the disclosure of which is incorporated herein by reference in its entirety.

TECHNICAL FIELD

The present disclosure relates generally to storage devices, more particularly, to a system and method for managing background activities of solid state drives with notification messages.

BACKGROUND

Solid state drives (SSDs) provide higher input/output (I/O) performance and lower latencies compared to traditional hard drives. Datacenters and enterprises use SSDs as data storage devices for their increased intolerance for latencies. Although SSDs provide low read and write (or I/O) latencies, they have unavoidable background activities such as media erasure and associated garbage collection (GC) requirements that can add hidden latencies. These hidden latencies can appear during I/O operations, making quality of service (QoS) for the I/O transactions inconsistent. Different SSD vendors have adopted various mechanisms to address these hidden latency issues. A common approach to obtain consistent latencies for SSD I/O operations is to provide a software controlled solution to control and manage background activities in a host software layer.

A typical software controlled solution addresses the hidden latency issues by disabling background management operations in an SSD and implementing them in a host software layer (e.g., a global flash translation layer (FTL)). The SSD can have control mechanisms to selectively enable/disable the background management operations. These software-controlled solutions have commoditized SSDs by pushing so-called "intelligence" for managing background operations to an I/O stack layer of a host operating system.

While software controlled approaches are workable solutions to mitigate the hidden latency issues, the intended commoditization depreciates and underutilizes the prominence, control, and differentiation that the present SSDs enjoy. The software controlled approaches may provide solutions that may work with some storage drive vendors, but they may add more prominence to a host software layer while limiting the controllability and manageability of the SSDs. To remedy this, operating system (OS) vendors have attempted to provide an up-level control on different device types through standardization.

However, software controlled approaches that provide generically applied intelligence may not be suitable for all drive types and all background management operations. Some of the software controlled solutions are limited only to garbage collection operations of an SSD. Further, the software controlled solutions do not necessarily account for forthcoming changes and improvements in technology that may affect the media layout and complexities of the controller architecture. For example, a new SSD technology may adopt a new bookkeeping scheme for erase blocks/zones, new block counts, new block size logical-to-physical (L2P) mappings, etc.

Device manufacturers usually have better knowledge regarding the organization of the operations and data layout for their own hardware than a generic software layer of a host OS. With emerging technologies such as 3D vertical NAND, generalized software controlled approaches to control and manage SSD background operations may not be appropriate. For example, a host OS layer such as a global flash-translation layer (FTL) that is intended for mitigating hidden latency issues of SSDs may not account for the layout and controller architecture complexities of the SSDs. As the stacking technology becomes denser, the actual I/O data distribution can become even more convoluted since a SSD vendor may choose to RAID/stripe or invoke specific placements based on hardware capabilities and product-specific designs. It is even more important that the SSD vendor chooses to keep that control for the best I/O path, latency management, and endurance. Further, host-managed algorithms tend to consume expensive CPU cycles and limit the performance of the system while consuming additional power.

SUMMARY

According to one embodiment, a method includes: receiving a query from a host operation system (OS); sending to the host OS, in response to the query, a list of background tasks to be performed in a data storage device; receiving a threshold value for one or more of the background tasks from the host OS; setting a timeout value associated with the threshold value; determining and notifying the timeout value to the host OS; determining that the threshold value is reached for a background task; and notifying the host OS that the SSD may perform the background task in the data storage device after the timeout value expires.

According to another embodiment, a data storage system includes: a data storage device for storing data; a host computer running a host operating system (OS) to perform input/output (I/O) operations to access data stored in the data storage device; and an interface between the data storage device and the host computer. The data storage device and the host OS are configured to exchange asynchronous messages including: a query from a host operation system (OS); a first response to the query including a list of background tasks to be performed in a data storage device; a threshold value for one or more of the background tasks; a timeout value associated with the threshold value; a second response including a timeout value associated with the threshold value; and an asynchronous notification to notify the host OS that the threshold value for a background task has reached and that the background task is to be performed after the timeout value expires.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
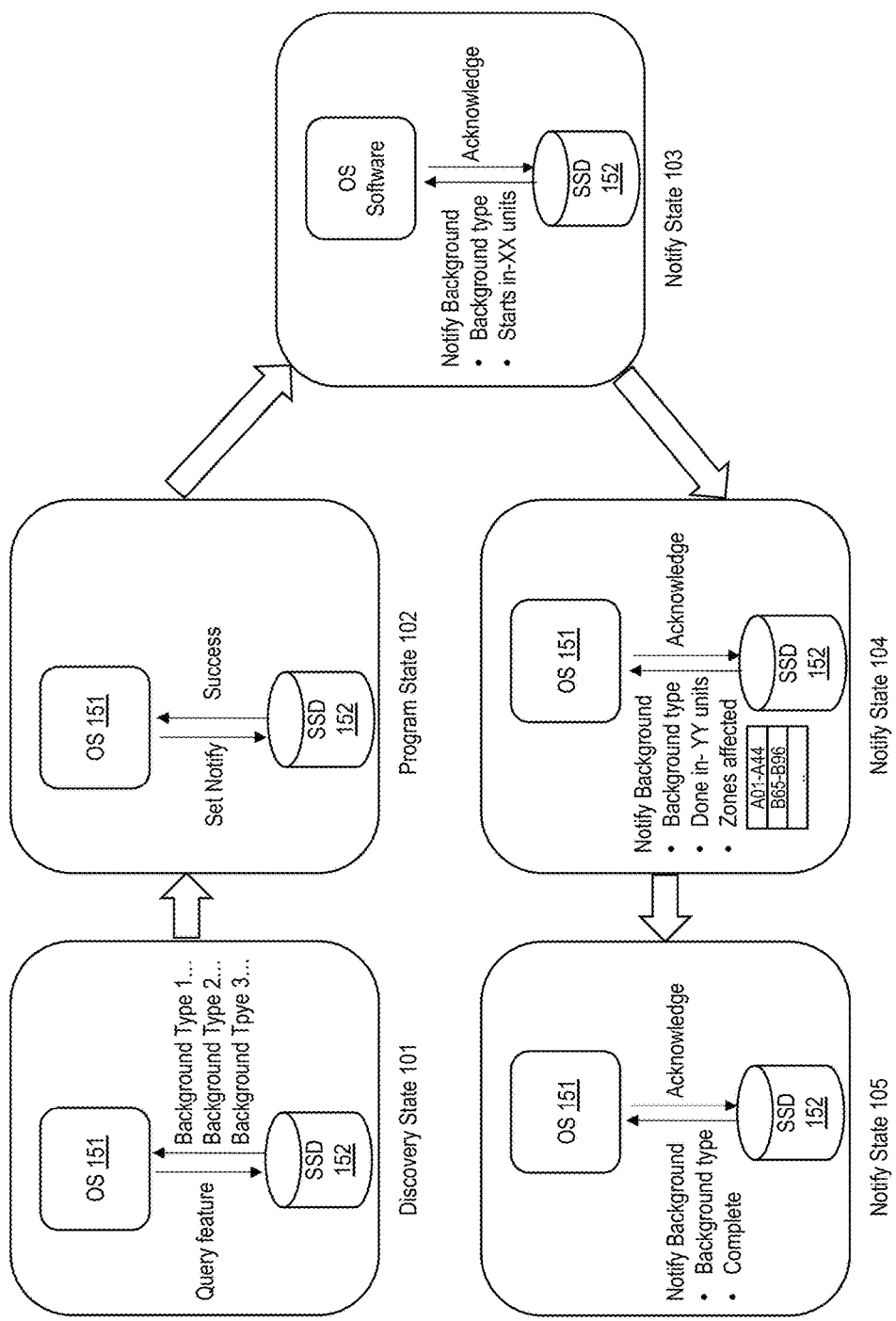
FIG. 1 illustrates an example process for implementing asynchronous notification feature between an SSD and a host OS, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a mechanism for solid state drives to efficiently manage background activities with notification messages. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system and method for coordinating background activity notifications initiated by an SSD with a host operating system (OS). Conventional host-managed algorithms tend to consume expensive CPU cycles while limiting the performance of the system and consuming additional power. The present system and method for coordinating background activity notifications provides improved performance and a system-level savings for the computing resources and power. The present asynchronous notification scheme can be adequately applied to a data storage system with a more densely populated setup. The coordination between the SSD and the host OS can circumvent latencies that may arise when the SSD initiates background activities that would normally impact foreground software responsiveness.

According to one embodiment, the present disclosure provides an asynchronous notification mechanism to allow an SSD to notify a host software/controller of background tasks such as media erasure and garbage collection. The SSD may be provided with one or more asynchronous notification definitions for providing the asynchronous notifications to the host OS. Further, the present disclosure provides a method for the host software/controller to subscribe to these asynchronous notifications through a standard interface (e.g., non-volatile memory (NVM) Express (NVMe), Serial AT Attachment (SATA), Serial Attached SCSI (Small Computer System Interface) (SAS)) and act on the asynchronous notifications received from the SSD. Examples of actions that can be performed by the host OS include, but are not limited to, deferring or delaying I/O operations to data storage block or zone notified by SSD, de-prioritizing a sub-set of the affected blocks or zones if the SSD supports detailed descriptions, instructing SSD to start background operation at once if the pre-notification provides a scheduled start time, instructing SSD to delay the notified operation to name a few.

FIG. 1 illustrates an example process for implementing an asynchronous notification feature between an SSD and a host OS, according to one embodiment. The present asynchronous notification feature can be implemented in a plurality of states including a discovery state 101, a program state 102, and one or more notification states, for example, notification state 103, 104, and 105. In the discovery state 101 and the program state, the host OS 151 and the SSD 152 agree on conditions for providing notification for background tasks. In these states, the SSD may be programmed to perform background activities according to a schedule that is agreed with the host OS 151. Once the SSD 152 is successfully programmed, the SSD 152 and the host OS 151 are ready to perform background tasks according to the present asynchronous notification. In the notification states 103, 104, and 105, the SSD 152 sends a notification to the host OS 151 to notify the host OS 151 that a particular background task is scheduled to be performed in a predetermined time window, and later that the scheduled background task has been completed. It is noted that the communication between the host OS 151 and the SSD 152 is asynchronous unless it is specifically indicated otherwise.

In the discovery state 101, the host OS 151 can query for a background notification feature to the SSD 152. In response to the query, the SSD 152 sends a list of the background tasks that the SSD 152 desires to expose to the host OS 151. Examples of such background tasks include, but are not limited to, media erasure and garbage collection. The SSD 152 may be configured to be able to select one or more types of background tasks and their levels to expose to the host OS 151. When the host OS 151 sends a query to the SSD 152, the host OS 151 may provide host information to the SSD 152, for example, a type of the host, resources available on the host, and the version of the host OS 151. Depending on the host information received from the host OS 151, the SSD 152 can expose different types of background tasks to the host OS 151.

In the program state 102, the host OS 151 can program the SSD 152 to implement conditions for the exposed background tasks. According to one embodiment, the host OS 151 can program a threshold value for the SSD 152 to notify the host OS 151 that a background task needs to be performed. Alternatively, the SSD 152 can program the threshold value based on various parameters including the type, the manufacturer, the storage capacity of its own in combination with the information received from the host OS 151 in the discovery state 101. When the threshold is reached, the SSD 152 can set a timeout value that corresponds to the imminent background task. The timeout can be defined as a countdown time before the schedule background task starts. Depending on the type of the background tasks, the host OS 151 can program the threshold value and/or the timeout differently. The timeout can be defined more descriptively as specific to the type of the background activity it is associated with.

In some embodiments, the host OS 151 can program the threshold value, and the SSD can determine the timeout value and notify to the host OS 151. In other embodiments, the SSD 152 and the host OS 151 can negotiate to set the timeout value. Once the SSD 152 agrees with the host OS 151 regarding the timeout value, the SSD 152 can send a success message to the host OS 151 acknowledging the agreement on the timeout value. The program state 102 is completed after the host OS 151 and the SSD 152 agree on the threshold values and the timeout values for all of the exposed background tasks.

Once the agreement is made between the host OS 151 and the SSD 152, the SSD 152 is ready to send asynchronous notifications to the host OS 151 to notify it that it is about to perform any of the exposed background tasks. In the notification state 103, the SSD 152 provides an asynchronous notification to the host OS 151 that it is about to perform a particular background task when the programmed threshold associated with the background task has been reached. For example, where the background task is garbage collection, the SSD 152 can be scheduled to perform the garbage collection when a virtual block of the SSD 152 is full or when the number of free pages in the SSD 152 is lower than the programmed threshold. In response, the host OS 151 can send an acknowledgment message to the SSD 152. The SSD 152 may start the timeout counter associated with the background task after sending the notification to the host OS 151.

The SSD 152 can provide additional details to the host OS 151 as a part of the asynchronous notification of the background task. According to one embodiment, in the notification state 104, the SSD 152 can send a follow-up notification to the host OS 151 to provide additional details regarding the scheduled background tasks notified in the notification state 103. The notification in the notify state 104 may be optional.

In the notification state 104, the SSD 152 and the host OS 151 can further negotiate through additional queries and responses, depending on the type of the background task that is scheduled in the notify state 103 and/or the specific implementation for the type of the SSD 152. In one embodiment, the host OS 151 can issue a request to deallocate or trim the timeout before a pending background task starts. In another embodiment, the host OS 151 can send a reschedule request to the SSD 152 to further delay the timeout for a pending background task by an additional time. Based on the its own internal conditions, the SSD 152 can accept or reject the reschedule request from the host OS 151.

In the follow-up notification in the notify state 104, the SSD 152 can send additional information to the host OS 151 regarding the background task scheduled in the notification state 103. In one embodiment, the SSD 152 can indicate the affected data storage blocks or zones in the SSD 152 that may become unavailable when the background task is performed in the SSD 152. In another embodiment, the SSD 152 can also provide the host OS 151 with an estimated time to complete the background task. For example, the affected zones by the background task may be a physical area of the SSD 152 in blocks, or, in some cases, larger areas such as a namespace or some other notations known to the host OS 151. In some embodiments, the SSD 152 may choose not to expose its internal areas such as erase blocks and erase zones. For lesser feature-rich SSDs, the SSD 152 may mark its total address space as unavailable instead of indicating only unavailable zones that is a part of the total address space. In response, the host OS 151 sends an acknowledgment message to the SSD 152.

In the notification state 105, the SSD 152 can notify the host OS 151 that the scheduled background task is completed. In response, the host OS 151 sends an acknowledgment message to the SSD 152.

Figure 2:
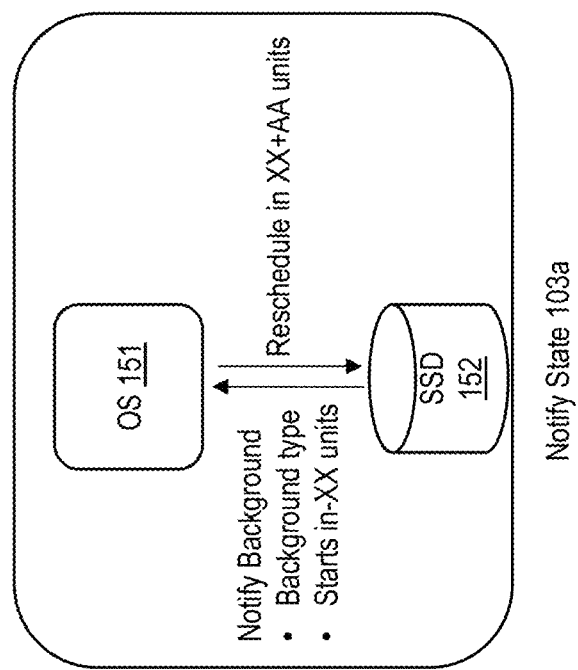
FIG. 2 illustrates an example process for notifying a tolerance hint for a background task, according to one embodiment.

According to some embodiments, the host OS 151 may provide background task tolerance hints. FIG. 2 illustrates an example process for notifying a tolerance hint for a background task, according to one embodiment. With this feature, the host OS 151 can decide if an unavailable area is a part of its valid data set, or is a part of a pending request, and route an I/O request to an alternate SSD that may store the same data. In some embodiments, the host OS 151 can choose to route read requests to other SSDs, but may choose to issue writes only to the current SSD 152.

The present asynchronous notification feature can become a part of the specification for a new industry standard definition or can use a vendor-specific definition. In one embodiment, the present asynchronous notification feature is usable within the NVMe specification. In another embodiment, the present asynchronous notification may be defined and implemented as a part of the SATA specification. In yet another embodiment, the present asynchronous notification feature may be defined and implemented as a part of the asynchronous event notification (AEN) mechanism of the SAS specification. Example environments and usages to apply the present asynchronous notification feature may include, but are not limited to, cluster and distributed environments, hyperscale environments in which the volume of data and the demand for certain types of workloads can increase exponentially, and high availability (HA) usages. The present asynchronous notification feature can provide the host OS with useful information about the status of the SSDs and allow the host OS to properly act on the asynchronous notifications received from the SSDs.

It is noted that the present asynchronous notification feature is not limited to a specific type of SSD (e.g., NVMe SSDs) and can apply to various other storage devices and environments with an asynchronous event notification feature implemented between a host OS and an SSD. In some embodiments, the present asynchronous notification feature can be vendor specific. It is also noted that the present asynchronous notification feature is not limited to a specific type of memory device (e.g., NAND flash). Other non-volatile memory solutions may have similar requirements for background management processing that affects QoS and/or predictable Input/Output Operations Per Second (IOPS), and the concepts presented herein are equally applicable to such technologies. It is further noted that the present asynchronous notification feature is not limited to a specific type of background tasks such as garbage collection. It should be understood that garbage collection is merely an example of background tasks that can be notified to the host OS when it is scheduled to be performed by the SSD; the inventive concepts herein apply to any background task that may impact QoS and/or IOPS.

The present asynchronous notification feature can be implemented in various ways and for various applications. The following examples will demonstrate how the present asynchronous notification feature can be implemented specifically for some target applications. These examples serve to demonstrate applications that are implemented with the present asynchronous notification feature, and thus should not be construed to be limited to the disclosed examples and embodiments.

According to one embodiment, the present asynchronous notification feature can be used in a write and read intensive application. The write and read intensive application may be for example, a map/reduce programming model. The map reduce programming model may be useful to implement a big data processing model in which a volume of data storage is large, and tasks are distributed among a large number of nodes. For example, the map reduce programming model is used for generating and processing large data sets with a parallel and distributed algorithm in a cluster. The map reduce programming model depends on computing resources (e.g., CPU), memory, network and storage for processing a large data set. Its execution model includes one active master node and a plurality of worker nodes. A client program with a large data set goes through one or more series of map workers and reduce workers to arrive at a final solution. From a programming point of view, the map reduce programming model can be implemented in two methods, a map method that performs sorting and filtering input files and a reduce method that performs a summary operation.

Figure 3:
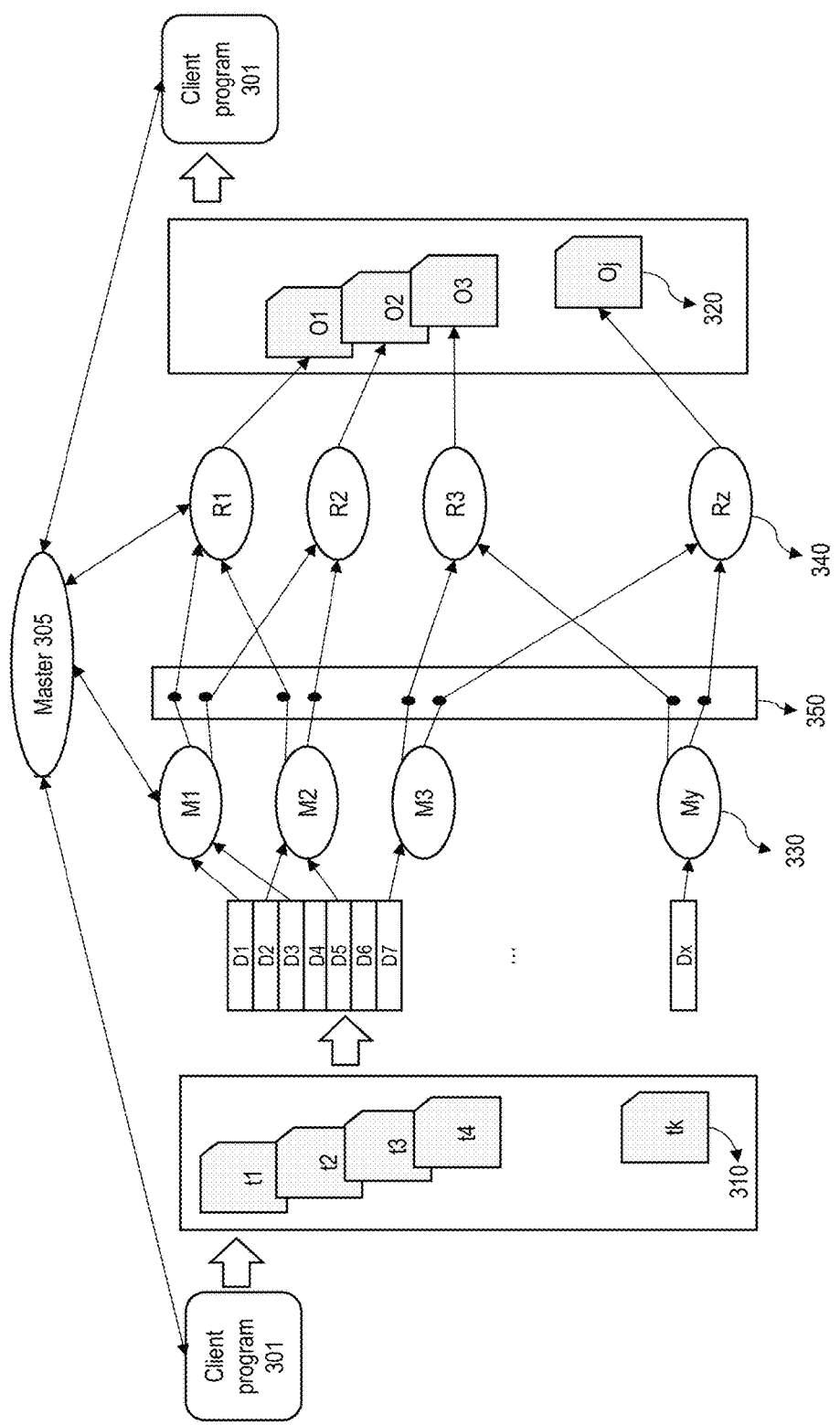
FIG. 3 illustrates an example of a write and read intensive application, according to one embodiment.

FIG. 3 illustrates an example of a write and read intensive application, according to one embodiment. The write and read intensive application includes Y map tasks (M1-My) and Z reduce tasks (R1-Rz). The Y map tasks and the Z reduce tasks are executed on the N worker nodes. In the present example, the N worker nodes include M worker nodes 330 and R worker nodes 340 (N=Y+Z). Each of the worker nodes 330 and 340 may include one or more SSDs (e.g., SSD 152 of FIG. 1). Only one task may run at any time on a given worker node.

A client program 301 can split the user's input files 310 into X pieces (D1-Dx) using a MapReduce library. Various MapReduce libraries are available in open-source and other implementations. The MapReduce library provides a programming paradigm, where a user application when formulated as a MapReduce can perform parallel operations without writing any parallel code. The user application writes serial map and reduce functions that can independently and parallely run on portions of a data set.

The size of each split piece of the user's input files 310 may be 16-64 Megabytes. However, it is noted that the split pieces of the input file 310 can have different sizes and of any size. A worker node 330 assigned for a map task can parse the contents of the input data files 310. The worker node 330 can pass the parsed contents of the input data files 310 to a user-defined map function 350. The intermediate data produced by the map function 350 is buffered in the memory of the map tasks M1-My. Periodically, the buffered intermediate data is written to the local SSD of the respective worker node, partitioned into R regions by a partitioning function. The partitioning may be managed by the master 305 and executed at the map tasks M1-My in a similar fashion as the map execution. The locations of the buffered data on the local SSD is passed back to the master node 305. The master node 305 is responsible for forwarding the locations to the reduce workers 340. The reduce worker 340 uses remote procedure calls (RPCs) to read the buffered data from the local drives of the map workers 330 and proceeds to sort and group the read data. An external sort may be applied if the amount of intermediate data is too large (one more map reduce level). The sorted data is passed on to the reduce function to generate an output file 320. The output file 320 is passed back to the client program 301.

The MapReduce library is designed to process very large volumes of data using hundreds or thousands of worker nodes. According to one embodiment, the MapReduce library can gracefully tolerate machine failures. The master node 305 pings every worker node 330 and 340 periodically. If no response is received from a worker node within a certain amount of time, the master node 305 marks the worker node as failed. The master node 305 can reset any map task completed by the failed worker node back to its initial idle state, and become eligible for scheduling on other worker nodes. Similarly, the master node 305 can reset any map task or reduce task in progress on a failed worker node to idle, and it becomes eligible for rescheduling. The map tasks that failed have to be re-executed since the output data is stored on the respective local drives. For reduce task failures, data will already be populated in a global file system. In addition, data can be replicated to a factor of 3 or higher to be tolerant in the case of failures. Accordingly, the MapReduce library provides a resilient solution to large-scale worker failures.

Without the present asynchronous notification feature, a host OS may be unaware of any SSD specific background tasks that are running on the local SSD that may impact the Map/Reduce task flows. Such background tasks can result in performance degradation that may lead to timeouts and eventual task reassignments. This impacts the overall distributed system and cluster performance efficiency. For example, the master 305 may incorrectly mark a host as failed even though it is functional but with a reduced performance due to a background activity. The present asynchronous notification feature allows a host OS to be aware of SSD-specific background tasks and estimate a timeout for unavailable worker nodes (SSDs) for Map/Reduce task flows.

According to one embodiment, the present asynchronous notification feature can be extended to a Map/Reduce fault tolerance. A Map task can subscribe to the present background task notification for the local SSDs. If notified, the map task can review the affected data by a scheduled background task and signal the master node 305. Depending on the implementation of the notification feature, the worker node may provide additional hints on the affected data and a timeline to the master node 305. Similarly, the global file system data that may reside on a drive array may also provide notifications to the master node 305. The master node 305 can decide to reroute I/O operations around the impacted node/array or continue the I/O operations. It is emphasized that the present asynchronous notification feature differs from a global flash translation layer (FTL) scheme in that a dedicated host software entity is not required to monitor and manage I/O, which for a large scale Map/Reduce system, may be a substantial task with a significant overhead.

According to one embodiment, the present asynchronous notification feature can be used for Oracle Structured Query Language (SQL) Database or MySQL Database. Most of the SQL/MySQL distributed databases are also designed with fault tolerance and a replication factor. The fault tolerance and the replication factor can be extended in the same way as described above with events initiated and generated by the SSDs, and making system utilization decisions of an elastic cloud compute service (e.g., a virtual machine dedicated as a cluster worker) or a worker task by a master node.

Figure 4:
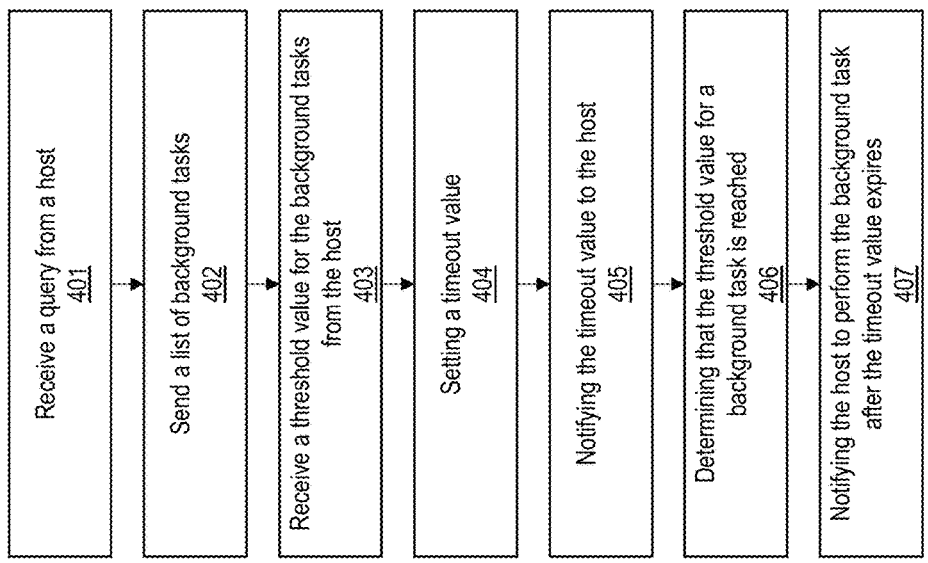
FIG. 4 is an example flowchart for performing a background task of an SSD with an asynchronous notification, according to one embodiment.

FIG. 4 is an example flowchart for performing a background task of an SSD with an asynchronous notification, according to one embodiment. The SSD receives a query from a host OS (step 401). In response to the query, the SSD sends a list of background tasks to be performed via an asynchronous notification (step 402). The SSD may only send to the host OS a subset of background tasks that can be performed that the host OS requests in the query. The SSD then receives a threshold value for each of the background tasks from the host OS (step 403). The SSD may determine a threshold value for a certain background task on its own or after negotiating with the host OS. The SSD sets a timeout value for each of the threshold value (step 404). The SSD may also negotiate with the host OS or determine the timeout value based on the information received from the host OS. After the timeout value is set, the SSD notifies the timeout value to the host OS (step 405). While performing performs I/O operations, the SSD monitors the threshold value for a specific background task and determines that it has been reached, indicating that the background task is imminent (step 406). The SSD notifies the host OS that the background task is about to be performed after the timeout value corresponding to the background task expires (step 407).

According to one embodiment, a method includes: receiving a query from a host operation system (OS); sending to the host OS, in response to the query, a list of background tasks to be performed in a data storage device; receiving a threshold value for one or more of the background tasks from the host OS; setting a timeout value associated with the threshold value; determining and notifying the timeout value to the host OS; determining that the threshold value is reached for a background task; and notifying the host OS that the SSD may perform the background task in the data storage device after the timeout value expires.

The list of background tasks may include one or more of a media erasure operation and a garbage collection operation in the data storage device.

The data storage device may be a solid-state drive (SSD) including NAND flash memories.

The method may further include: receiving host information from the host OS in the query. The host information may include one or more of a type of a host, resources available on the host, and the version of the host OS.

The list of background tasks may be determined based on the host information.

The method may further include: negotiating with the host OS to determine the timeout value based on a type of the background task.

The method may further include: receiving from the host OS a request to deallocate or trim the timeout value of a background task; and deallocating or trimming the timeout value of the background task according to the request from the host OS.

The method may further include: receiving from the host OS a request to delay the timeout value by an additional value; and delaying the background task according to the request from the host OS.

The method may further include: sending information to the host OS including affected data storage blocks or zones of the data storage device.

The method may further include: sending a notification that the background task is completed in the data storage device; and receiving an acknowledgement from the host OS.

The host OS and the data storage device may communicate through one of non-volatile memory (NVM) Express (NVMe), Serial AT Attachment (SATA), and Serial Attached SCSI (SAS).

According to another embodiment, a data storage system includes: a data storage device for storing data; a host computer running a host operating system (OS) to perform input/output (I/O) operations to access data stored in the data storage device; and an interface between the data storage device and the host computer. The data storage device and the host OS are configured to exchange asynchronous messages including: a query from a host operation system (OS); a first response to the query including a list of background tasks to be performed in a data storage device; a threshold value for one or more of the background tasks; a timeout value associated with the threshold value; a second response including a timeout value associated with the threshold value; and an asynchronous notification to notify the host OS that the threshold value for a background task has reached and that the background task is to be performed after the timeout value expires.

The list of background tasks may include one or more of a media erasure operation and a garbage collection operation in the data storage device.

The data storage device may be a solid-state drive (SSD) including NAND flash memories.

The data storage device may be configured to receive host information from the host OS in the query. The host information may include one or more of a type of a host, resources available on the host, and the version of the host OS.

The list of background tasks may be determined based on the host information.

The data storage device may be configured to negotiate with the host OS to determine the timeout value based on a type of the background task.

The data storage device may be configured to receive from the host OS a request to deallocate or trim the timeout value; and deallocate or trim the timeout value of the background task according to the request from the host OS.

The data storage device may be configured to receive from the host OS a request to delay the timeout value by an additional value; and delay the background task according to the request from the host OS.

The data storage device may be configured to send information to the host OS including affected data storage blocks or zones of the data storage device.

The interface is one of non-volatile memory (NVM) Express (NVMe), Serial AT Attachment (SATA), and Serial Attached SCSI (SAS).

The above example embodiments have been described hereinabove to illustrate various embodiments of implementing a system and method for providing a mechanism for solid state drives to efficiently manage background activities with notification messages. Various modifications and departures from the disclosed example embodiments will occur to those having ordinary skill in the art. The subject matter that is intended to be within the scope of the invention is set forth in the following claims.

What is claimed is:

1. A method comprising:
   receiving a query from a host operating system (OS);
   sending to the host OS, in response to the query, a list of background tasks to be performed in a data storage device;
   receiving a threshold value for one or more of the background tasks from the host OS, wherein the threshold value indicates that the one or more of the background tasks need to be performed when exceeding the threshold value;
   setting a timeout value associated with the threshold value, wherein the timeout value is a countdown time before the one or more background tasks start;
   determining and notifying the timeout value to the host OS;
   determining that the threshold value is reached for a background task of the one or more background tasks; and
   notifying the host OS that the data storage device may perform the background task in the data storage device after the timeout value expires.

2. The method of claim 1, wherein the list of background tasks includes one or more of a media erasure operation and a garbage collection operation in the data storage device.

3. The method of claim 1, wherein the data storage device is a solid-state drive (SSD) including NAND flash memories.

4. The method of claim 1, further comprising:
   receiving host information from the host OS in the query, wherein the host information includes one or more of a type of a host, resources available on the host, and the version of the host OS.

5. The method of claim 4, wherein the list of background tasks is determined based on the host information.

6. The method of claim 1 further comprising: negotiating with the host OS to determine the timeout value based on a type of the background task.

7. The method of claim 1, further comprising:
   receiving from the host OS a request to deallocate or trim the timeout value of a background task; and
   deallocating or trimming the timeout value of the background task according to the request from the host OS.

8. The method of claim 1, further comprising:
   receiving from the host OS a request to delay the timeout value by an additional value; and
   delaying the background task according to the request from the host OS.

9. The method of claim 1, further comprising: sending information to the host OS including affected data storage blocks or zones of the data storage device.

10. The method of claim 1, further comprising:
    Sending a notification that the background task is completed in the data storage device; and
    receiving an acknowledgement from the host OS.

11. The method of claim 1, wherein the host OS and the data storage device communicate through one of non-volatile memory (NVM) Express (NVMe), Serial AT Attachment (SATA), and Serial Attached SCSI (SAS).

12. A data storage system comprising:
    a data storage device for storing data;
    a host computer running a host operating system (OS) to perform input/output (I/O) operations to access data stored in the data storage device; and
    an interface between the data storage device and the host computer,
    wherein the data storage device and the host OS are configured to exchange asynchronous messages including:
    a query from the host operating system;
    a first response to the query including a list of background tasks to be performed in a data storage device;
    a threshold value for one or more of the background tasks, wherein the threshold value indicates that the one or more of the background tasks need to be performed when exceeding the threshold value;
    a timeout value associated with the threshold value, wherein the timeout value is a countdown time before the one or more background tasks start;
    a second response including a timeout value associated with the threshold value; and
    an asynchronous notification to notify the host OS that the threshold value for a background task of the one or more background tasks has reached and that the background task is to be performed after the timeout value expires.

13. The data storage system 12, wherein the list of background tasks includes one or more of a media erasure operation and a garbage collection operation in the data storage device.

14. The data storage system 12, wherein the data storage device is a solid-state drive (SSD) including NAND flash memories.

15. The data storage system 12, wherein the data storage device is configured to receive host information from the host OS in the query, and wherein the host information includes one or more of a type of a host, resources available on the host, and the version of the host OS.

16. The data storage system 15, wherein the list of background tasks is determined based on the host information.

17. The data storage system 12, wherein the data storage device is configured to negotiate with the host OS to determine the timeout value based on a type of the background task.

18. The data storage system 12, wherein the data storage device is configured to receive from the host OS a request to deallocate or trim the timeout value; and deallocate or trim the timeout value of the background task according to the request from the host OS.

19. The data storage system 12, wherein the data storage device is configured to receive from the host OS a request to delay the timeout value by an additional value; and delay the background task according to the request from the host OS.

20. The data storage system 12, wherein the data storage device is configured to send information to the host OS including affected data storage blocks or zones of the data storage device.

21. The data storage system 12, wherein the interface is one of non-volatile memory (NVM) Express (NVMe), Serial AT Attachment (SATA), and Serial Attached SCSI (SAS).

* * * * *